United States Patent
Lan et al.

(10) Patent No.: US 7,079,692 B2
(45) Date of Patent: Jul. 18, 2006

(54) REDUCED COMPLEXITY VIDEO DECODING BY REDUCING THE IDCT COMPUTATION IN B-FRAMES

(75) Inventors: Tse-Hua Lan, Ossining, NY (US); Zhun Zhong, Croton-On-Hudson, NY (US); Yingwei Chen, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 684 days.

(21) Appl. No.: 09/912,131

(22) Filed: Jul. 24, 2001

(65) Prior Publication Data
US 2003/0021482 A1 Jan. 30, 2003

(51) Int. Cl.
*G06K 9/36* (2006.01)

(52) U.S. Cl. ................................. 382/233; 382/236

(58) Field of Classification Search ................ 382/233, 382/235, 236, 248, 250, 238
See application file for complete search history.

(56) References Cited

U.S. PATENT DOCUMENTS 6,025,878 A 2/2000 Boyce et al. ............... 348/402

*Primary Examiner*—Duy M. Dang

(57) ABSTRACT

The present invention is directed to reduced B-frame decoding. According to the present invention, the number of transform coefficients in B-frames are reduced to produce reduced B-frames. Also, inverse scanning and inverse quantization is performed on the reduced B-frames. Further, an inverse transform is performed on the reduced B-frames. In one embodiment of the present invention, the reduced B-frames are produced by identifying blocks associated with the B-frames and selecting transform coefficients included in a predetermined area of the identified blocks.

16 Claims, 3 Drawing Sheets

US 7,079,692 B2

REDUCED COMPLEXITY VIDEO DECODING BY REDUCING THE IDCT COMPUTATION IN B-FRAMES

BACKGROUND OF THE INVENTION

The present invention relates generally to video compression, and more particularly, to decoding where the number of transform coefficients in B-frames are reduced in order to reduce the computational complexity of the decoding.

Video compression incorporating a discrete cosine transform (DCT) is a technology that has been adopted in multiple international standards such as MPEG-1, MPEG-2, MPEG-4, and H.262. Among these schemes, MPEG-2 is the most widely used, in DVD, satellite DTV broadcast, and the U.S. ATSC standard for digital television.

An example of a MPEG video decoder is shown in FIG. 1. The MPEG video decoder is a significant part of MPEG-based consumer video products. In such products, one design goal is to minimize the complexity of the decoder while maintaining the video quality. In order to achieve this goal, an adaptive scheme has been used to either fully perform or skip completely a discrete cosine transform (IDCT) computation of B-frames.

The above-mentioned adaptive scheme is based on a simple DC coefficient test. If the DC coefficient of a DCT block is larger than a threshold, the full IDCT is computed. Otherwise, the computation of the IDCT is skipped, which provides computational savings. However, a problem in this method is that simple threshold test cannot always accurately determine the sparseness of the test. Therefore, the decoded video output quality is not always good and the computations required in testing the DC coefficient in a media processor may take quite a few CPU cycles.

SUMMARY OF THE INVENTION

The present invention is directed to reduced B-frame decoding. According to the present invention, the number of transform coefficients in B-frames are reduced to produce reduced B-frames. Also, inverse scanning and inverse quantization is performed on the reduced B-frames. Further, an inverse transform is performed on the reduced B-frames.

In one embodiment of the present invention, the reduced B-frames are produced by identifying blocks associated with the B-frames and selecting transform coefficients included in a predetermined area of the identified blocks. Also, in one embodiment, the inverse scanning is inverse zig-zag scanning and the inverse transform is an inverse discrete cosine transform.

BRIEF DESCRIPTION OF THE DRAWINGS

Referring now to the drawings were like reference numbers represent corresponding parts throughout.

DETAILED DESCRIPTION

The present invention is directed to reduced B-frame decoding. According to the present invention, the number of transform coefficients in B-frames are reduced in order to reduce the computational complexity of the decoding. Since decoded B-frames are not used as anchors for the other type of frames, errors in B-frames do not propagate to other frames. In other words, since I or P-frames do not depend on B-frames, any errors in a B-frame do not spread to any other frames in the video sequence.

In view of the above, the present invention reduces the number of transform coefficients in B-frames while leaving the I and P-frames unchanged. Reducing the number of transform coefficients in B-frames may reduce the quality of such frames. However, since the quality of the other frames is maintained, any errors caused by the reduced B-frames do not propagate to any other frames. Therefore, prediction drift is minimized so that the quality of the output video is maintained.

Figure 2:
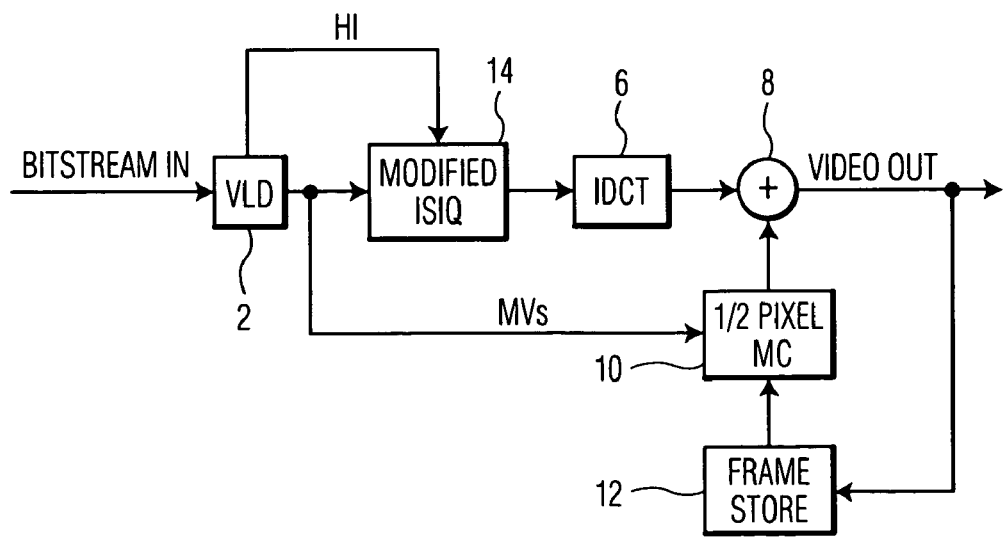
FIG. 2 is a block diagram of a decoder according to the present invention.

Further, since the present invention reduces the number of transform coefficients in B-frames, the overall computational complexity of the decoding is reduced. This would be desirable in a number of applications. For example, if a decoder is implemented in a media processor chip, reducing the computational complexity would conserve CPU time. Further, if a decoder is implemented in a specific hardware configuration such as an ASIC, reducing the computational complexity would conserve power One example of a decoder according to the present invention is shown in FIG. 2. As can be seen, the decoder includes a first path made up of the variable-length decoder (VLD) 2, a modified inverse-scan and inverse-quantization (ISIQ) unit 14 and an inverse discrete cosine transform (IDCT) unit 6, and a second path made up of the VLD 2, motion compensation (MC) unit 10 and frame store 12. An adder 8 is also included that combines the outputs of the first and second paths to produce the output video.

Figure 1:
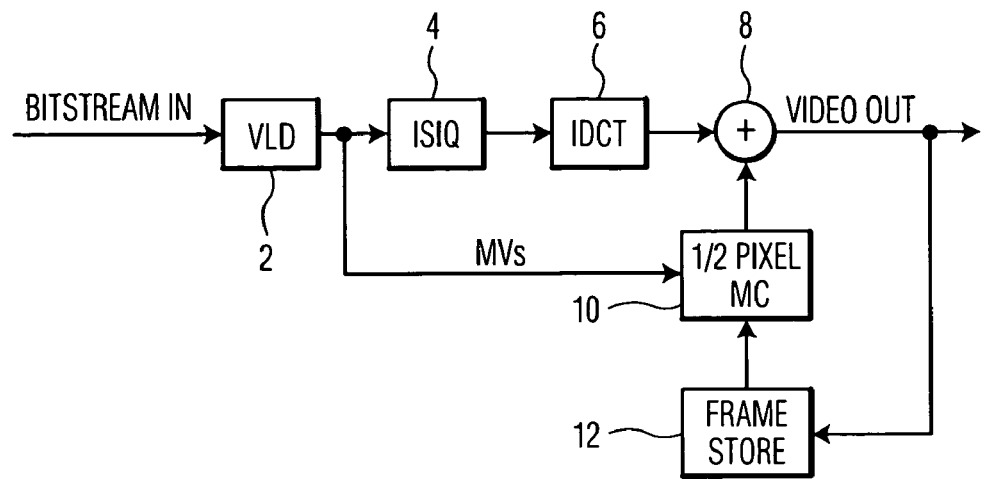
FIG. 1 is a block diagram of a MPEG decoder.

The decoder of FIG. 2 operates the same as the one in FIG. 1 except for the modified ISIQ unit 14. During operation, the VLD 2 decodes the incoming bit-stream to produce DCT coefficients. For I and P-frames, the modified ISIQ unit 14 will simply perform inverse zig-zag scanning and inverse quantization on the DCT coefficients included in such frames.

However, according to the present invention, the modified ISIQ unit 14 reduces the number of DCT coefficients in B-frames before performing the inverse scanning and inverse quantization on the DCT coefficients included in such frames. Since the number of DCT coefficients are reduced, the amount of computations required to perform the inverse scanning and quantization on the B-frames is reduced. Therefore, the overall computational complexity of the decoding is reduced.

Figure 3:
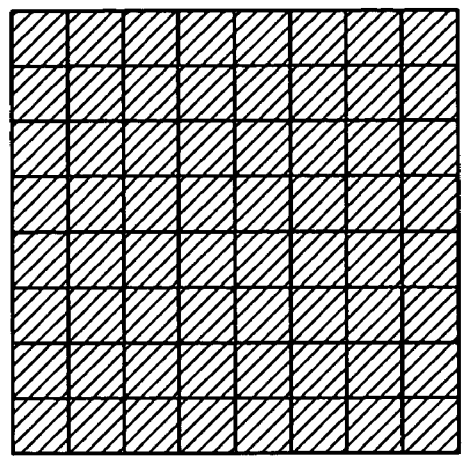
FIG. 3 is a diagram of an example of an 8×8 block.

In this embodiment, the modified ISIQ unit 14 reduces the number of DCT coefficients in B-frames by first identifying DCT blocks associated with the B-frames. In DCT-type compression, each of the frames are usually divided into blocks of pixels before being encoded. An example of an 8×8 block is shown in FIG. 3.

In order to identify the DCT blocks associated with the B-frames, the modified ISIQ unit 14 looks at header information HI received from the VLD 2. Such standards as MPEG-1, MPEG-2, MPEG-4, and H.262 all requires compliant bit-streams to include header fields that indicate what type of frame a DCT block originated from before being encoded. Thus, during operation, the VLD 2 decodes the incoming bit-stream to produce the HI that enables the modified ISIQ unit 14 to identify the DCT blocks associated with the B-frames.

Figure 4A:
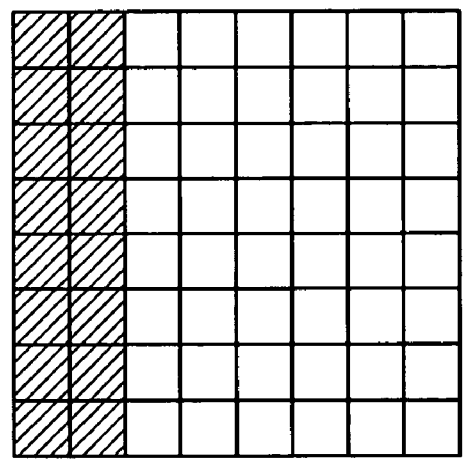
FIGS. 4A–4B are diagrams illustrating examples of a predetermined area selected in blocks according to the present invention.
Figure 4B:
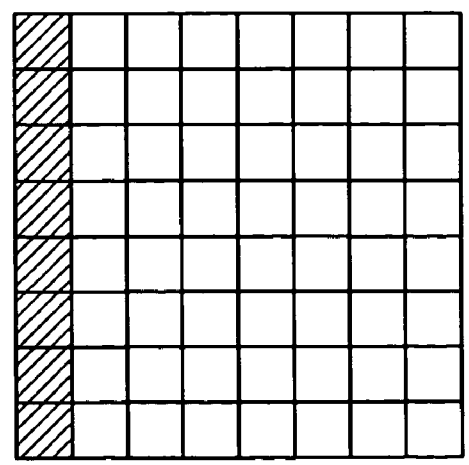

After identifying the DCT blocks associated with the B-frames, the modified ISIQ unit 14 then selects the DCT coefficients included in a predetermined area of these blocks. Examples of such a predetermined area are shown in FIGS. 4A and 4B. As can be seen in FIG. 4A, the predetermined area is a 2×8 area and in FIG. 4B, the predetermined area is an 1×8 area. Thus, according to the present invention, the modified ISIQ unit 14 will only select coefficients within a predetermined area as represented by the shaded areas of these examples. Any coefficients outside the predetermined area are not utilized.

However, it should be noted that the areas shown in FIGS. 4A and 4B are only intended as examples. The present invention also contemplates other predetermined areas with various shapes and sizes.

As described above, during operation, the modified ISIQ unit 14 performs inverse scanning and quantization on the DCT coefficients included in the reduced B-frames as well as on I and P-frames. The IDCT unit 6 then performs an inverse discrete cosine transform on the frames received from the modified ISIQ unit 14.

As described above, the number of DCT coefficients in B-frames have been reduced by only selecting coefficients within a predetermined area of the blocks. Since the inverse discrete cosine transform is performed on a smaller number of coefficients, a less complex method may be implemented by the IDCT unit 6.

In many image coding standards, two-dimensional DCT/IDCT operations are used. A two-dimensional IDCT is computed from a one-dimensional IDCT on columns, then on rows. Therefore, for an 8×8 IDCT, a one-dimensional IDCT is performed on the eight columns and then on the eight rows of the resulting 8×8 block.

However, as previously described, the present invention utilizes reduced B-frames for example that may include either that 8×1 or 8×2 blocks Thus, for example the IDCT unit 6 may be configured to perform either an 8×1 or 8×2 IDCT. For an 8×1 IDCT, a one-dimensional IDCT is performed on the first column while the other seven columns are set to zero. Further, a one-dimensional IDCT is performed on the 8 rows after performing the column one-dimensional IDCT.

For an 8×2 IDCT, the one-dimensional IDCT is applied in a similar manner, as described above for the 8×1 IDCT. A one-dimensional IDCT may be expressed as follows:

$$s(x) = \text{sum} \{u=0 \text{ to } 7\} C(u)/2 * S(u) \cos[(2x+1) u*pi/16] \quad (1)$$

where c(u)=1/sqrt(2) for u=0, 1 for u>0, x=0 to 7 and S(u) represent one-dimensional DCT coefficients.

As described above, the IDCT unit 6 performs the IDCT on a reduced number of coefficients in B-frames. Thus, the amount of computations required to perform the IDCT should also be reduced and thereby further reduce the overall computational complexity of the decoding. For example, for the 8×1 or 8×2 IDCT, at least ⅜ of the total computation may be reduced.

Figure 5:
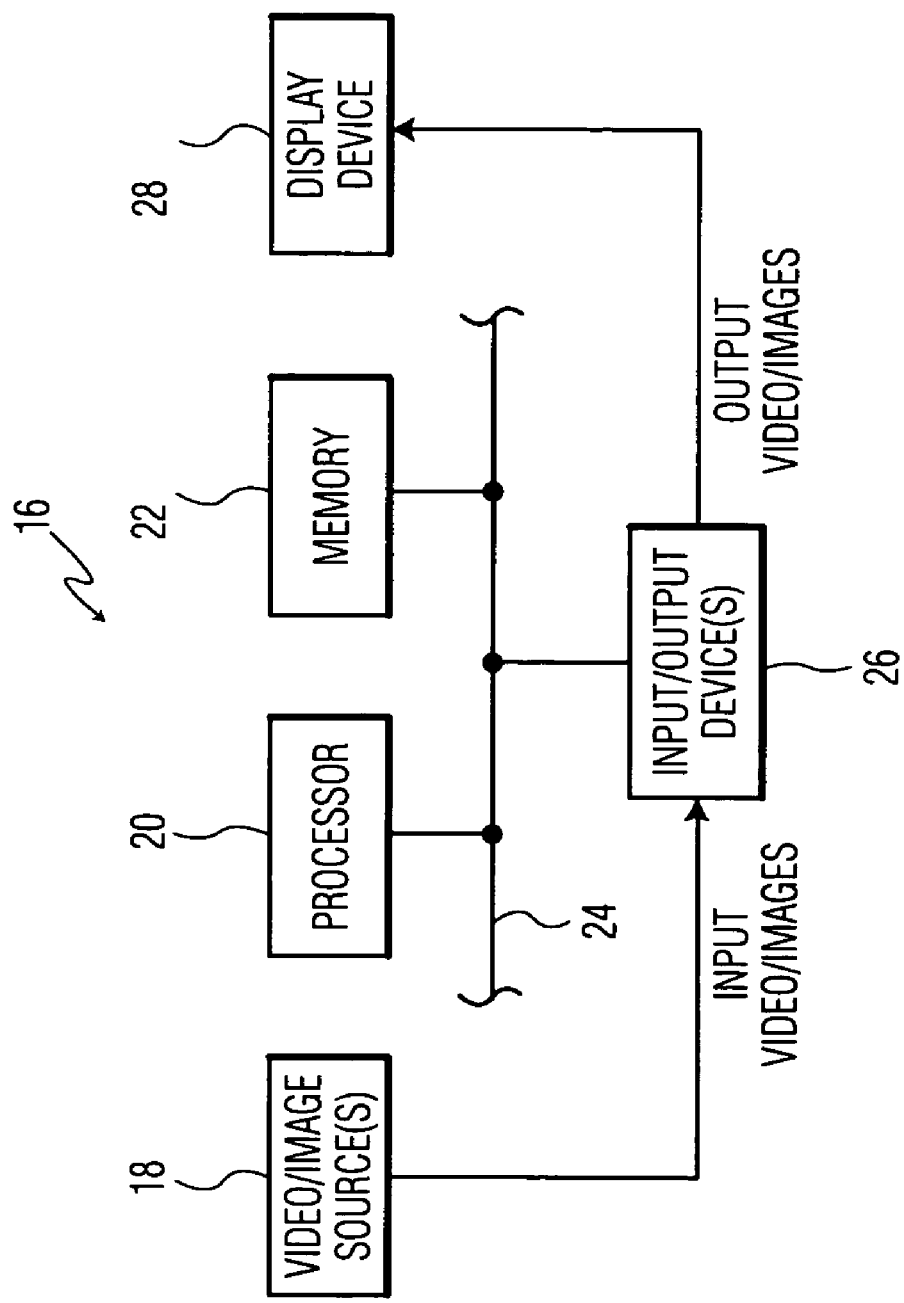
FIG. 5 is a block diagram of one example of a system according to the present invention.

One example of a system in which the reduced B-frame decoding may be implemented is shown in FIG. 5. By way of example, the system may represent a television, a set-top box, a desktop, laptop or palmtop computer, a personal digital assistant (PDA), a video/image storage device such as a video cassette recorder (VCR), a digital video recorder (DVR), a TiVO device, etc., as well as portions or combinations of these and other devices. The system 16 includes one or more video sources 18, one or more input/output devices 26, a processor 20, a memory 22 and a display device 28.

The video/image source(s) 18 may represent, e.g., a television receiver, a VCR or other video/image storage device. The source(s) 18 may alternatively represent one or more network connections for receiving video from a server or servers over, e.g., a global computer communications network such as the Internet, a wide area network, a metropolitan area network, a local area network, a terrestrial broadcast system, a cable network, a satellite network, a wireless network, or a telephone network, as well as portions or combinations of these and other types of networks.

The input/output devices 26, processor 20 and memory 22 communicate over a communication medium 24. The communication medium 24 may represent, e.g., a bus, a communication network, one or more internal connections of a circuit, circuit card or other device, as well as portions and combinations of these and other communication media. Input video data from the source(s) 18 is processed in accordance with one or more software programs stored in memory 22 and executed by processor 20 in order to generate output video/images supplied to the display device 28.

In one embodiment, the reduced B-frame decoding of FIG. 2 is implemented by computer readable code executed by the system. The code may be stored in the memory 22 or read/downloaded from a memory medium such as a CD-ROM or floppy disk. In other embodiments, hardware circuitry may be used in place of, or in combination with, software instructions to implement the invention.

While the present invention has been described above in terms of specific examples, it is to be understood that the invention is not intended to be confined or limited to the examples disclosed herein. For example, the present invention has been described using the MPEG-2 framework. However, it should be noted that the concepts and methodology described herein is also applicable to any DCT/notion prediction schemes, and in a more general sense, any frame-based video compression schemes where picture types of different inter-dependencies are allowed. Therefore, the present invention is intended to cover various structures and modifications thereof included within the spirit and scope of the appended claims.

What is claimed is:

1. A method for decoding video, compxising the steps of:
   reducing a number of transform coefficients in B-frames to produce reduced B-frames;
   inverse scanning the reduced B-frames;
   performing inverse quantization on the reduced B-frames; and
   performing an inverse transform on the reduced B-frames;
   wherein the reduced B-frames are produced by:
   identifying blocks associated with the B-frames; and
   selecting transform coefficients included in a predetermined area of the blocks associated with the B-frames, wherein the predetermined area includes each of the coefficients in at least one IDCT column and coefficients outside the predetermined area are set to zero.

2. Tbe method of claim 1, wherein the inverse scanning is inverse zig-zag scanning.

3. The method of claim 1, wherein the inverse transform is an inverse discrete cosine transform.

4. The method of claim 1, wherein the predetermined area is either a 1×8 area or a 2×8 area.

5. A memory medium including code for decoding video, the code comprsing:
- a code for reducing a number of transform coefficients in B-frames to produce reduced B-frames;
- a code for inverse scanning the reduced B-frames;
- a code for performing inverse quantization on the reduced B-frames; and
- a code for performing an inverse transform on the reduced B-frames; wherein the code for producing the reduced B-frames includes:
- a code for identifying blocks associated with the B-frames; and
- a code for selecting transform coefficients included in a predetermined area of the blocks associated with the B-frames, wherein the predetermined area includes each of the coefficients in at least one IDCT column and coefficients outside the predetermined area are set to zero.

6. The memory medium of claim 5, wherein the inverse scanning is inverse zig-zag scanning.

7. The memory medium of claim 5, wherein the inverse transform is an inverse discrete cosine transform.

8. The meniory medium of claim 5, wherein the predetermined area is either a 1×8 area or a 2×8 area.

9. An apparatus for decoding video, comprising:
- means for reducing a number of transform coefficients in B-frames to produce reduced B-frames;
- means for inverse scanning the reduced B-frames;
- means for performing inverse quantization on the reduced B-frames; and
- means for performing an inverse transform on the reduced B-frames; wherein reduced B-frames are produced by:
- identifying blocks associated with the B-frames; and
- selecting transform coefficients included in a predetermined area of the blocks associated with the B-frames, wherein the predetermined area includes each of the coefficients in at least one IDCT column and coefficients outside the predetermined area are set to zero.

10. The apparatus of claim 9, wherein the inverse scanning is inverse zig-zag scanning.

11. The apparatus of claim 9, wherein the inverse transform is an inverse discrete cosine transform.

12. The apparatus of claim 9, wherein the predetermined area is either a 1×8 area or a 2×8 area.

13. An apparatus for decoding video, comprising:
- an inverse scan and quantization unit for reducing a number of transform coefficients in B-frames to produce reduced B-frames, inverse scanning the reduced B-frames and performing inverse quantization on the reduced B-frames; and
- an inverse transform unit for performing an inverse transform on the reduced B-frames;
- wherein the reduced B-frames are produced by:
- identifying blocks associated with the B-frames; and
- selecting transform coefficients included in a predetermined area of the blocks associated with the B-frames, wherein the predetermined area includes each of the coefficients in at least one IDCT column and coefficients outside the predetermined area are set to zero.

14. The apparatus of claim 13, wherein the inverse scanning is inverse zig-zag scanning.

15. The apparatus of claim 13, wherein the inverse transform is an inverse discrete cosine transform.

16. The apparatus of claim 13, wherein the predetermined area is either a 1×8 area or a 2×8 area.

* * * * *